United States Patent
Duan et al.

(10) Patent No.: US 10,171,614 B2
(45) Date of Patent: Jan. 1, 2019

(54) CACHE MEMORY BALANCING BASED ON MOVING OBJECT PREDICTION

(71) Applicant: International Business Machines Corporation, Armonk, NY (US)

(72) Inventors: Ning Duan, Beijing (CN); Xin Tang, Ningbo (CN); Dongyun Wang, Jiangsu (CN); Zhi Hu Wang, Beijing (CN); Kunyan Yin, Ningbo (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 164 days.

(21) Appl. No.: 15/428,884

(22) Filed: Feb. 9, 2017

(65) Prior Publication Data

US 2018/0227386 A1 Aug. 9, 2018

(51) Int. Cl.
| | |
|---|---|
| *H04L 29/08* | (2006.01) |
| *G06F 12/0813* | (2016.01) |
| *G06F 12/084* | (2016.01) |
| *G07C 5/00* | (2006.01) |

(52) U.S. Cl.
CPC ........ *H04L 67/2842* (2013.01); *G06F 12/084* (2013.01); *G06F 12/0813* (2013.01); *G07C 5/008* (2013.01); *H04L 67/1002* (2013.01); *H04L 67/12* (2013.01); *G06F 2212/154* (2013.01); *G06F 2212/60* (2013.01); *G06F 2212/62* (2013.01)

(58) Field of Classification Search
CPC . H04L 67/2842; H04L 67/1002; H04L 67/12; G06F 12/0813; G06F 12/084; G06F 2212/62; G06F 2212/154; G06F 2212/60; G07C 5/008
See application file for complete search history.

(56) References Cited

U.S. PATENT DOCUMENTS

| | | | |
|---|---|---|---|
| 6,438,652 B1 * | 8/2002 | Jordan | G06F 9/505 709/219 |
| 8,706,131 B2 | 4/2014 | Winters | |
| 8,768,616 B2 | 7/2014 | Kristinsson et al. | |
| 9,267,806 B2 | 2/2016 | Conner | |
| 2009/0248871 A1 * | 10/2009 | Takase | H04L 47/10 709/226 |

(Continued)

*Primary Examiner* — Kim T Nguyen
(74) *Attorney, Agent, or Firm* — Cantor Colburn LLP; Kevin Michael Jordan

(57) ABSTRACT

A computer-implemented method for cache memory management in a distributed computing environment includes tracking, via a cache balancing engine, a plurality of vehicles operating in a first region. The method further includes executing, via the cache balancing engine, an analysis for a subset of the plurality of vehicles in the first region to determine a weighted mean velocity for each vehicle in the subset of the plurality of vehicles in the first region. The method further includes determining, via the cache balancing engine, based on the analysis, whether a second regional server tracking a second plurality of vehicles in a second region is likely to have an unbalanced cache memory, and rebalancing, via the cache balancing engine, cache memory data in the first regional server and cache memory data in the second regional server responsive to determining that the second regional server is likely to have an unbalanced cache memory.

20 Claims, 8 Drawing Sheets

(56) References Cited

U.S. PATENT DOCUMENTS

2012/0151073 A1* 6/2012 Bai ................ G06F 17/30902
709/228
2016/0037379 A1 2/2016 Shafiee et al.

\* cited by examiner

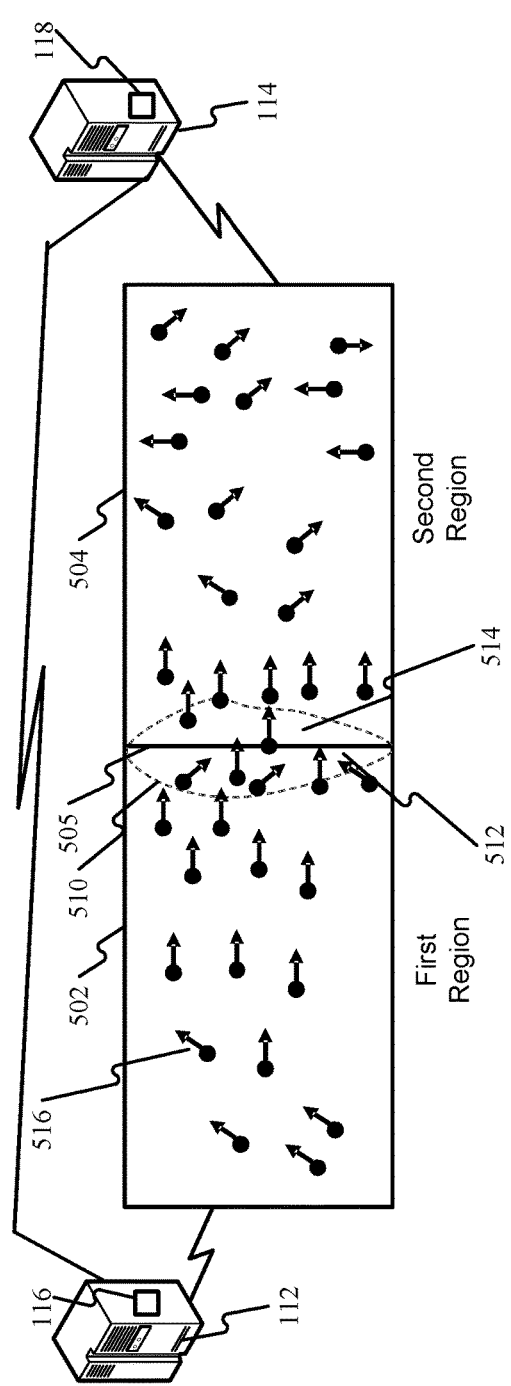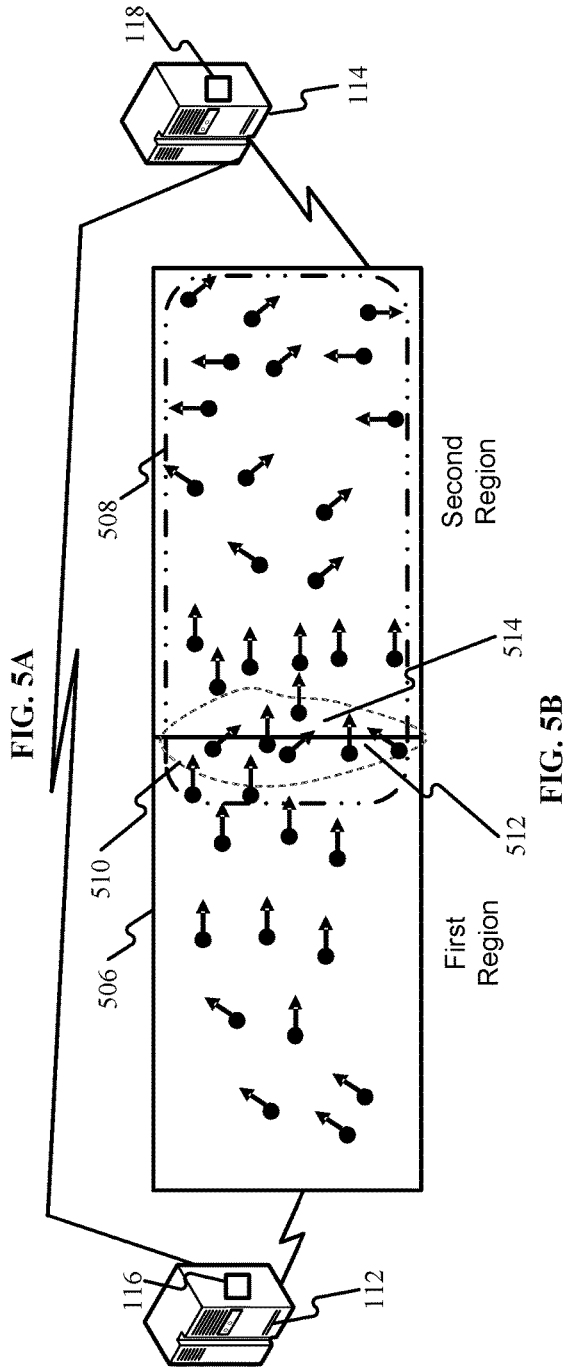
FIG. 5A
FIG. 5B

CACHE MEMORY BALANCING BASED ON MOVING OBJECT PREDICTION

BACKGROUND

The present disclosure relates to cache memory management, and more specifically, to cache memory load balancing based on moving object prediction.

Moving objects such as vehicles operating in an Internet of Things (IoT) context incorporate various real-time factors into operational decisions made by the vehicles during operation. For example, when operating in IoT environments, connected vehicles can query and receive data indicative of various operational factors including but not limited to weather, traffic conditions, road types, air quality, etc. Real-time communication (e.g., continuous queries/responses) of information can consume large amounts of bandwidth.

SUMMARY

A computer-implemented method for cache memory management in a distributed computing environment includes tracking, via a cache balancing engine, a plurality of vehicles operating in a first region. The method further includes executing, via the cache balancing engine, an analysis for a subset of the plurality of vehicles in the first region to determine a weighted mean velocity for each vehicle in the subset of the plurality of vehicles in the first region. The method further includes determining, via the cache balancing engine, based on the analysis, whether a second regional server tracking a second plurality of vehicles in a second region is likely to have an unbalanced cache memory, and rebalancing, via the cache balancing engine, cache memory data in the first regional server and cache memory data in the second regional server responsive to determining that the second regional server is likely to have an unbalanced cache memory.

Other embodiments of the present invention include a system and a computer program product.

BRIEF DESCRIPTION OF THE DRAWINGS

The subject matter regarded as the invention is particularly pointed out and distinctly claimed in the claims at the conclusion of the specification. Other features, and advantages of the invention are apparent from the following detailed description taken in conjunction with the accompanying drawings, in which:

FIG. 5A depicts a diagram of first region and second region prior to enlarging, according to one or more embodiments of the present invention;

FIG. 5B depicts a first region and an enlarged second region according to one or more embodiments of the present invention;

DETAILED DESCRIPTION

Figure 1A:
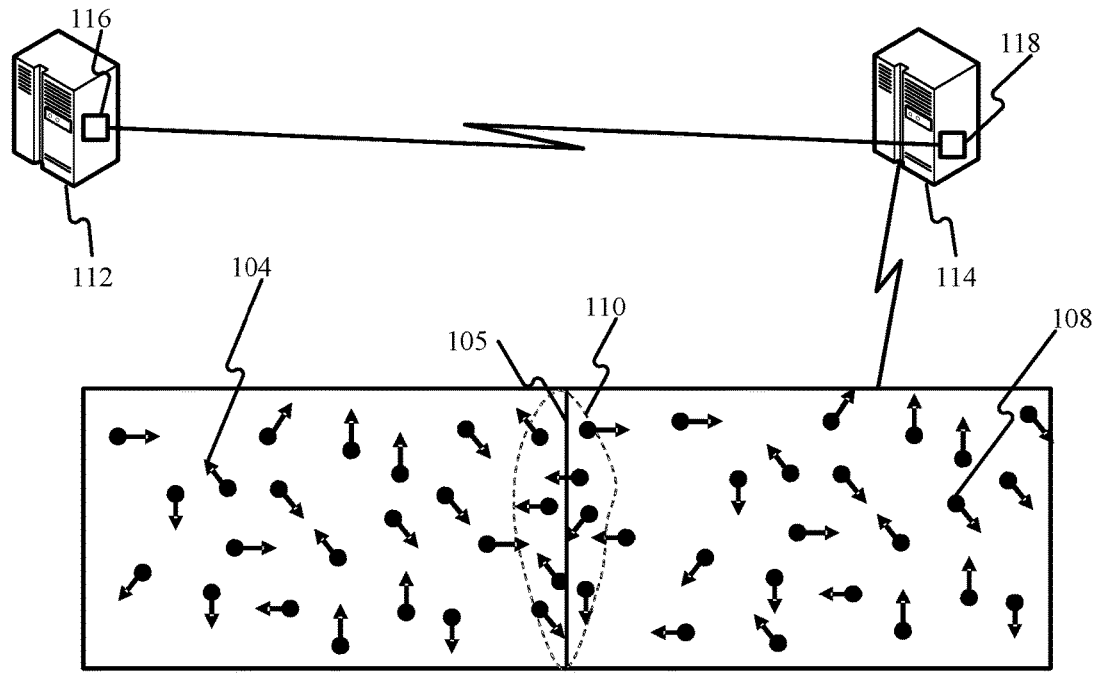
FIG. 1A depicts a diagram of a plurality of vehicles operating in a first and a second region according to one or more embodiments of the present invention.

In order to manage continuous data queries from large numbers of moving objects, on the server-side, cache mechanisms can be used to process multiple queries in real-time. However, context and map information can be computationally large—e.g., include terabytes or petabytes of information—which is cached and processed for all the moving objects at once. One conventional implementation is to divide the physical area (e.g., country, province, city and even district) into several geographic regions, where the context information (e.g., the weather, navigation, road condition information, etc.) is cached and processed in a distributed computing environment by multiple servers assigned for computation according to geographic divisions. With this approach, the moving object queries are distributed to the target cache of the assigned server based on the regional division of the moving vehicles. When the vehicles are in motion, switching cache data from region to region (e.g., server to server) in real-time to process continuous queries by the vehicles can make caching and processing the information problematic, e.g., when unforeseen events cause mass-migration of the vehicles.

The Internet of things (IoT) refers to an internetworking of physical devices, such as vehicles, buildings and other items (also referred to as "connected devices" and "smart devices") embedded with electronics, software, sensors, actuators, along with a network connectivity that enable these connected devices to collect and exchange data. The IoT can allow connected devices to be sensed and/or controlled remotely across existing network infrastructure, creating opportunities for more direct integration of the physical world with computer-based systems, and resulting in improved efficiency, accuracy and economic benefit. When IoT is augmented with sensors and actuators, the technology can become an instance of the more general class of cyber-physical systems, which can also encompass technologies such as so-called smart grids, smart homes, intelligent transportation and smart cities. Each connected device can be uniquely identifiable through its embedded computing system, while remaining able to interoperate with the existing Internet infrastructure.

"Things," in the IoT sense, can refer to a wide variety of devices such autonomous, semi-autonomous or other automobiles, aircraft, equipment transponders, etc. The term "things" in the IoT sense, can also refer to an inextricable mixture of hardware, software, data and service. These things collect data with the help of various existing technologies and the data is then flowed autonomously to and between other devices.

Moving devices in an IoT context to can generate large amounts of data from diverse locations, which can require quick aggregation of the data, and an increase in the need to index, store, and process the data more effectively. Moving object networks such as vehicle networks, for example, contact remote servers to process the extremely large volume of operational data. The remote connections with servers also manage the connections with other moving vehicles in the vicinity.

One conventional method for dividing the computational burden among multiple servers is to divide the physical area into several regions with separate responsible servers sharing the load. This approach can work well when the distribution of connected vehicles in motion is even. But a particular regional server assigned the computational responsibility for a region can become unbalanced (e.g., become relatively overburdened with data processing) when a large number of moving vehicles become concentrated into a single geographic region (e.g., peak traffic, vehicle collisions, demonstrations, weather, etc.). This loss of balance of processing responsibility between servers can be exacerbated by a rapid and continuous swap-in and swap-out of cache data for vehicles operating near the boundary of the two regions, especially during times of high vehicle density in the boundary area. The rapid and continuous swap-in and swap-out of cached data between servers can cause computational latency due to each respective server trading the information with each other's cache memory.

FIG. 1A depicts a plurality of vehicles operating in a first and a second region, according to one or more embodiments of the present invention. Referring now to FIG. 1A, first region 102 and second region 106 are shown. First region 102 and second region 106 represent pre-defined geographic regions in which vehicles are operating. Vehicles 104 are depicted operating in first region 102, and a second plurality of vehicles 108 are depicted operating in second region 106. First region 102 and second region 106 share a boundary 105. The general vicinity of boundary 105 is described as boundary area 110.

In an urban scenario, vehicles 104 and 108 are automobiles operating on city roads. Vehicles 104 and 108 are depicted as vectors having a direction and a velocity. In other scenarios, vehicles 104 and 108 can be another type of vehicle operating in different environment, such as, for example, boats navigating through predefined channels in a marina, or mobile devices operating in (and/or navigating within) a connected infrastructure such as a connected "smart" building. Although generally described herein as automobiles navigating city streets, it should be appreciated that vehicles 104 and 108 can be any other type of connected "Thing" operating in some other operational environment.

Figure 1B:
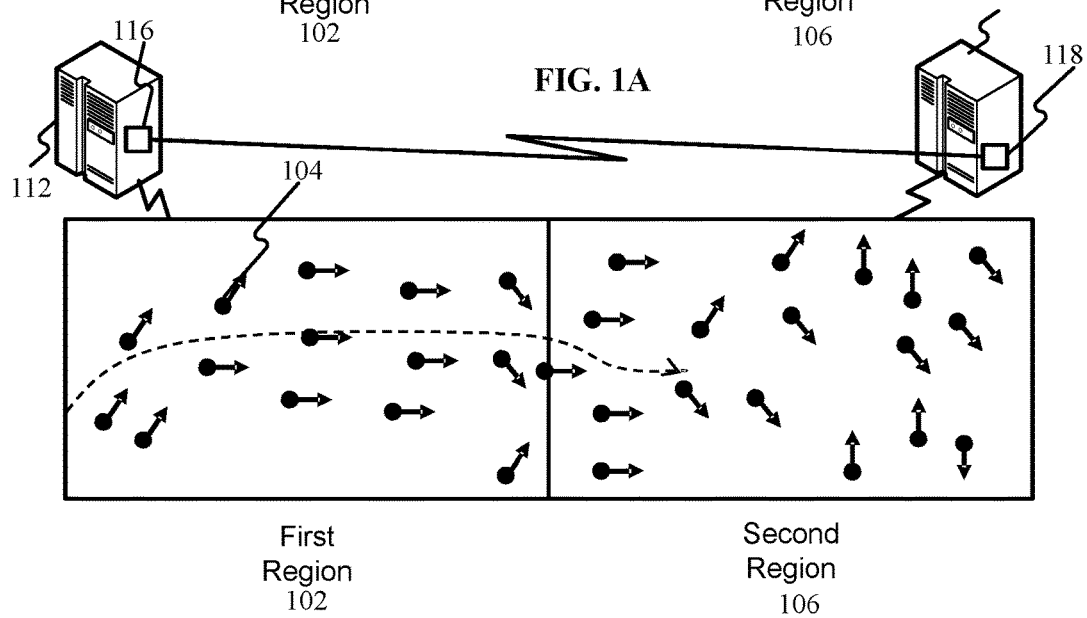
FIG. 1B depicts a diagram of a plurality of vehicles migrating from the first region to the second region according to one or more embodiments of the present invention.

FIG. 1B depicts a plurality of vehicles migrating from the first region to the second region according to one or more embodiments of the present invention. First region 102 and second region 106 are depicted in FIG. 1A and FIG. 1B as rectangular with a generally equal areas with respect to one another. It should be appreciated that first region 102 and second region 106 can take any shape and can have any relative size with respect to one another. For example, first region 102 and second region 106 can be optimized in area and shape to divide average vehicle density evenly when operating in a steady state. In a perfectly optimized regional division, the moving distribution of vehicles 104 and 108 would be generally equal for all directions of vehicle travel in a region.

As shown in FIG. 1A, a first regional server 112 and a second regional server 114 receive the queries based on geographic region of each vehicle. First regional server 112 can be assigned the computation for vehicles 104 operating within first region 102. Second regional server 114 can be assigned the computation for vehicles 108 operating in second region 106. A server assigned computation for a region, generally speaking, receives data queries from vehicles and transmits data in response.

Vehicles 104 and 108 send data queries continuously to first regional server 112 and second regional server 114. The data queries include requests for data (and transmission of operational information) including map data, weather data, GPS data, traffic data, event schedules, emergency or disaster information, etc. On the server-side, cache mechanisms are used to process the multiple queries from vehicles 104 and 108 in real-time. However, as explained above, context and map data can be computationally large (e.g., terabytes or petabytes of information), which is cached and processed in the respective servers for all the moving objects at once.

With a distributed computing approach where the distributed computing device is assigned by predefined geographic region, the queries from vehicles 104 are distributed to a target cache 116 of first regional server 112. For example, cache memory 116 can operate on data received from vehicles 104 if computer first regional server 112 is the assigned server for first region 102. Second regional server 114 can be the server assigned to process data received from vehicles 108 operating in second region 106. Having a perfectly optimized distribution of vehicles 104 and 108 would allow for the servers processing each respective region's data to operate efficiently, with minimal swapping in and swapping out of cache information between servers when vehicles migrate from one region to another.

However, in reality a perfect distribution may not hold for vehicles in motion. Some vehicles in boundary area 110 can migrate from first region 102 to second region 106, and vice versa. Each respective vehicle is connected to and trading information to and from the assigned server for that region. When a vehicle crosses boundary 105, the cached data associated with that vehicle must be passed from first regional server 112 (assigned to data processing for region where the vehicle is migrating from) to the second regional server 114 (processing the data for the new "destination" region). When many vehicles are in motion, switching cache data from region to region (and thus, server to server) in real-time to process continuous queries by the vehicles makes caching and processing the information problematic, especially when unforeseen events cause mass-migration of the vehicles. As shown in FIG. 1B, vehicles 104 are depicted migrating in large numbers from first region 102 to second region 106. In everyday traffic scenarios, the mass migration can be caused by any number of events, including traffic due by vehicles avoiding a previous traffic accident, a sporting or cultural event, holiday travel, etc.

Figure 8:
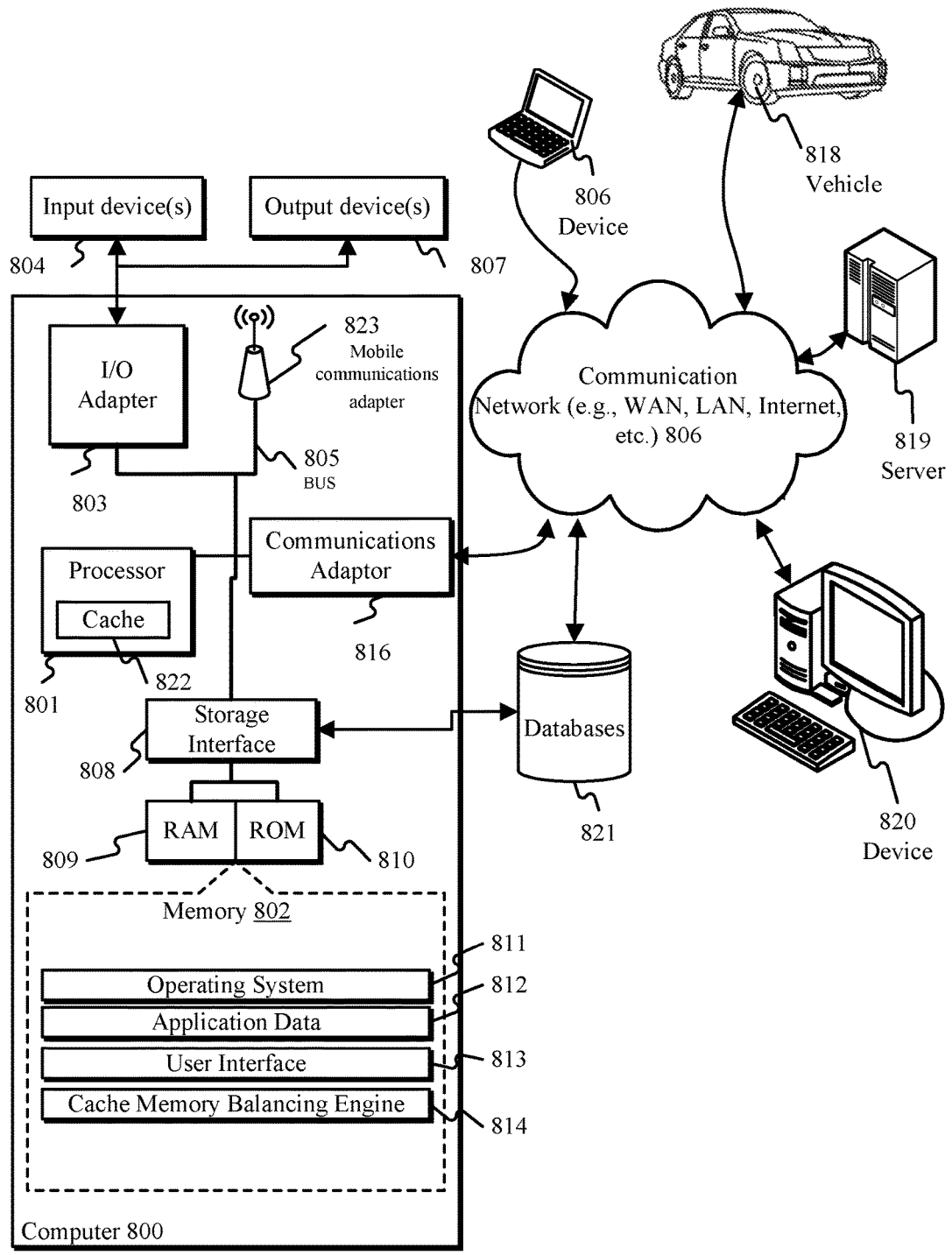
FIG. 8 depicts a block diagram of a computer system according to one or more embodiments of the present invention.

Embodiments of the present invention described herein can balance the cache management of multiple distributed servers by tracking vehicles operating in a region and predicting a main direction trend for vehicles in both the short-term and the long-term with respect to time. In some aspects, a prediction engine (operating as part of a cache memory balancing engine 814, as shown in FIG. 8) can determine the main moving direction of the objects in a respective region, and determine, based on the direction analysis, whether a second regional server (tracking a second plurality of vehicles in a second region) is likely to have computational latency due to cache imbalances caused by passing back and forth cache data between the regional servers.

Figure 2:
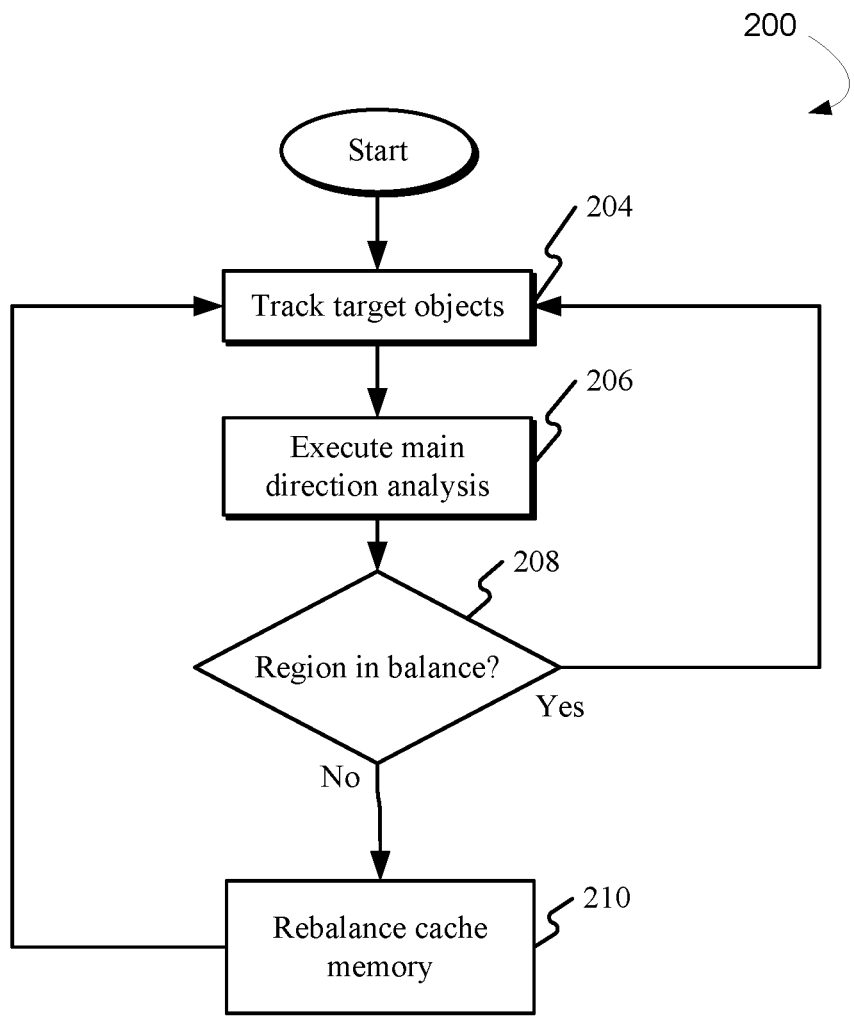
FIG. 2 depicts a flow diagram of a method for managing cache memory in a distributed computing environment, according to one or more embodiments of the present invention.

FIG. 2 depicts a flow diagram of a method 200 for managing cache memory in a distributed computing environment (such as, for example, a cloud computing environment 600 as will be discussed in more detail with respect to FIG. 6), according to one or more embodiments of the present invention. Referring now to FIG. 2, a processor (e.g., processor 801 as shown with respect to FIG. 8) operating in a distributed server (e.g., regional server 112) can track a plurality of vehicles 104 operating in first region 102, as shown in block 204.

The method proceeds to block 206, where processor 801 executes a main direction analysis for the plurality of vehicles 104 in first region 102 to determine a weighted mean velocity for each vehicle in the plurality of vehicles in first region 102. In some aspects, vehicles 104 are operatively connected to processor 801 and receiving real-time context information indicative of operational factors.

After executing the directional analysis (block 206), processor 801 determines, based on the direction analysis, whether a second regional server 114 (tracking a second plurality of vehicles 108 in a second region 106) is likely to have an unbalanced cache memory 118, as shown in decision block 208. In some aspects, second regional server 114 is configured for tracking the second plurality of vehicles 108 in the second region 106, and the second region 106 is adjacent to the first region 102. As used herein, adjacent regions share at least one boundary with one another.

As shown in decision block 208, processor 801 determines whether the second regional server 114 and the first regional server 112 are in balance.

As shown in block 210, processor 801 rebalances cache memory 116 data in first regional server 112 and cache memory 118 data in second regional server 114 responsive to determining that second regional server 114 is likely to have an unbalanced cache memory 118.

Figure 3:
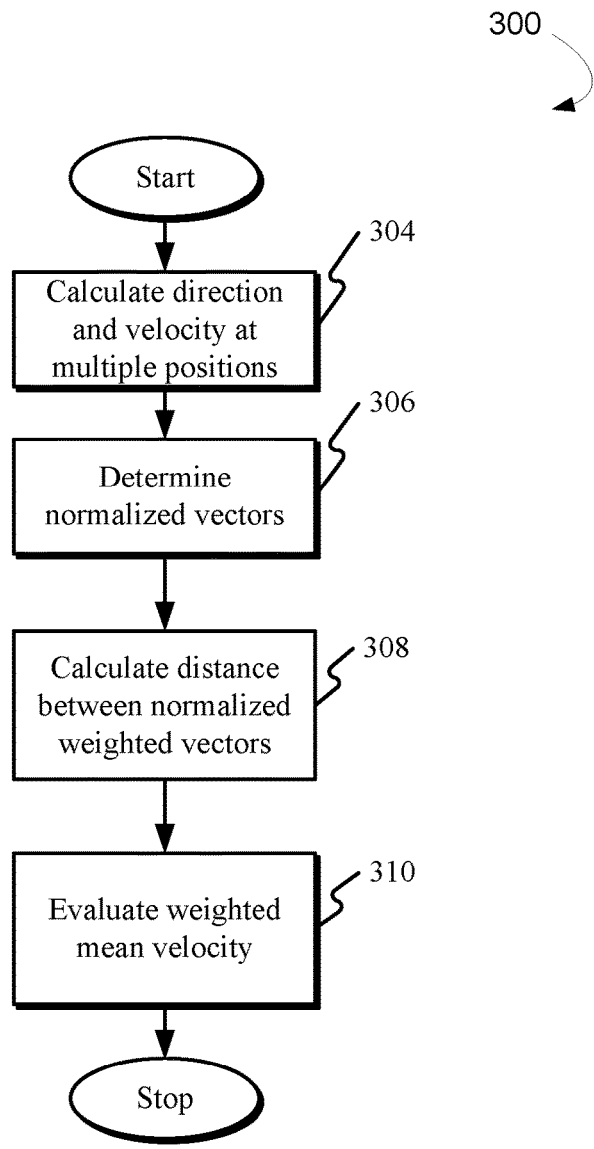
FIG. 3 depicts a flow diagram of a method for executing a directional analysis according to one or more embodiments of the present invention.

FIG. 3 depicts a flow diagram of a method 300 for executing a directional analysis according to one or more embodiments of the present invention. Referring now to FIG. 3, processor 801 can calculate a velocity at a plurality of positions, as shown in block 304. In some aspects, processor 801 calculates mean velocity based on GPS location samples periodically at times within pre-defined time windows. A pre-defined time window can be, for example 5 seconds, 30 seconds, 1 minute, etc.

As shown in block 306, processor 801 determines, based on the velocity at the plurality of positions and a direction of travel, at least two normalized weighted vectors. The normalized weighted vectors can include a direction component, a velocity component, and a normalized weight component. In some aspects, the normalized vector weight is based, at least in part, on a sample time of determining each relative position in the plurality of positions. Samples later in time are weighted by processor 801 more heavily than samples earlier in time. By normalizing vector weight, processor 801 can give a larger respective weight to more recent positions to account for short-term moving trends and long-term moving trends.

As shown in block 308, processor 801 determines a distance between the normalized weighted vectors.

As shown in block 310, processor 801 evaluates a weighted mean velocity based on at least one normalized weighted vector and the distance between the normalized weighted vectors. The evaluation of the weighted mean velocity can be indicative of a short-term moving trend prediction of each respective vehicle. An exemplary use of the short-term moving trend prediction is discussed with reference to block 404 of FIG. 4

Figure 4:
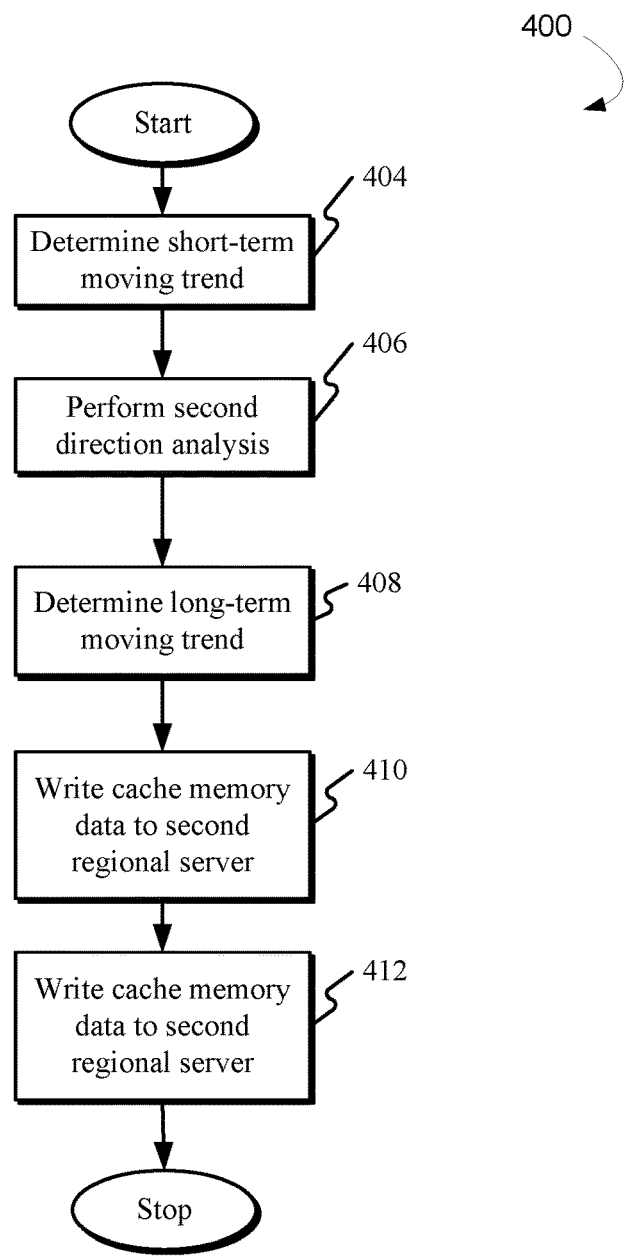
FIG. 4 depicts a flow diagram of a method for rebalancing a cache memory according to one or more embodiments of the present invention.

FIG. 4 depicts a flow diagram of a method 400 for rebalancing a cache memory, according to one or more embodiments of the present invention. Referring now to FIG. 4, in block 404 processor 801 determines, based on one or more operational factors, a short-term moving trend of the plurality of vehicles 104 in first region 102. The short-term moving trend is determined with a forgetting function that gives the larger weight to the most recent vehicular positions. In some embodiments, the evaluation of a weighted mean velocity (see e.g., block 310, FIG. 3) can be indicative of a short-term moving trend of a vehicle.

In block 406, processor 801 performs a second direction analysis for the vehicles 104. The second direction analysis can estimate a main trend of vehicular movement using an objective function of the normalized weight vectors. For example, processor 801 can decompose a distribution of a sum of the normalized weight vectors into a transform matrix to create a distribution of projected points, and use the result to calculate the weighted mean velocity of a directional trace and processor 801 can calculate, based on the weighted mean velocity, a weighted variance of velocity for the directional trace.

In block 408, processor 801 determines a long-term moving trend of the plurality of vehicles in the first region based on operational factors. The long-term moving trend is determined by processor 801 by calculating a distance between each position and its projected position on the location grid. In some aspects, processor 801 can also account for sudden vehicular turns. Noticing a sudden turn, a vehicle may run along the new direction for a relatively long duration time (e.g., multiple minutes). However, the trajectory before this turn may indicate a direction perpendicular to the new direction. In this situation, processor 801 the predication fails during most of the trip time. To improve the prediction in that situation, another position distribution is modeled by processor 801 on the new direction. Processor 801 has now determined a short-term moving trend and a long-term moving trend based on the predictions.

As shown in block 410, processor 801 writes the cache memory data from the first regional server to a cache memory in the second regional server based on the short-term moving trend and the long-term moving trend.

As shown in block 412, processor 801 enlarges the second region to include a portion of the first region. The portion of the first region included in the second region is proximal to boundary 105 dividing first region 102 and second region 106.

FIG. 5A depicts a diagram of first region 102 and second region 106 prior to enlarging, according to one or more embodiments of the present invention. FIG. 5B depicts a first region 506 and enlarged second region 508 after processor 801 enlarges second region 508 according to one or more embodiments of the present invention. Referring briefly to FIG. 5A, an exemplary first region 502 is depicted sharing a boundary 505 with a second region 504 prior to enlarging. A boundary area 510 includes a first boundary area portion 512 that lies in first region 502, and a second boundary area portion 514 that lies in second region 504. As previously discussed, one or more events can cause vehicles 516 operating in first region 502 to migrate to second region 504. After processor 801 determines, based on one or more operational factors, that a short-term moving trend of the plurality of vehicles 516 in first region 502, processor 801 performs a second direction analysis for the vehicles, which weights the direction based on a time factor of when the directional samples are taken for each vehicle. The operational factors can include one or more of a group of factors that such as traffic information, weather information, global positioning system (GPS) information, geographic map information, sensor data, and velocity information, etc.

At block FIG. 5B, processor 801 determines a long-term moving trend, and writes the cache memory data from first regional server 112 (from cache memory 116) to cache memory 118 in second regional server 114 based on the short-term moving trend and the long-term moving trend. Processor 801 then enlarges second region 504 to include a portion of the first region, wherein the portion of the first region included in the second region is proximal to a boundary dividing the first region and the enlarged second region 508 (which now encompasses boundary areas portions 512 and 514). In some aspects, the enlarged second region 508 now includes the first boundary area portion 512, and first region 502 (from FIG. 5A) is now reduced in size (shown in FIG. 5B as first region 506). Second boundary portion 514 remains in enlarged second region 508. The advantages of enlarging second region 508 include providing processing flexibility to deal with a sudden accident or event (e.g., road construction, traffic congestion, an exhibition, disasters, etc.). Another advantage includes continuous optimization of region divisions without external (human) analysis or user intervention.

In some aspects, rebalancing cache memory can include loading cache data associated with vehicles operating in first boundary area portion 512 into cache memory 118 in second regional server 114, while maintaining that same data in cache memory 116 in first regional server 112. Processor 801 can execute this rebalancing responsive to determining that the regions are in balance, but there exists increased traffic density in boundary area 510. Processor 801 can also perform this rebalancing responsive to determining that the regions are unbalanced. With the cache data now saved in both of first regional server 112 and second regional server 114, vehicles concentrated in boundary area 510 will not cause computational latency caused by passing cached data back and forth between servers multiple times, and also reduces or eliminates server responses for data queries from the vehicles passing over the border. Processor 801 prepares in advance for an anticipated switch in and switch out of data in advance of receiving the queries for that data, which reduces latency.

Embodiments of the present invention improve functionality of servers in IoT environments that track and connect to moving objects such as automobiles. Aspects of the invention can balance and distribute the moving object queries to the target cache of s assigned servers based on the regional division of the moving vehicles when there are abnormal variations, migrations, or other anomalies occurring with vehicle traffic in the regions. When the vehicles are in motion, embodiments of the present invention can reduce or eliminate switching cache data from region to region (e.g., server to server), and decrease or eliminate latency for real-time continuous queries by the vehicles to the servers in a cloud computing environment.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least four service models, and at least four deployment models.

Characteristics of a Cloud Model can include the following:

On-demand self-service: a cloud consumer can unilaterally provision computing capabilities, such as server time and network storage, as needed automatically without requiring human interaction with the service's provider.

Broad network access: capabilities are available over a network (e.g., network 806, as depicted in FIG. 8) and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Characteristics of Service Models can include the following:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network (e.g., network 806, as depicted in FIG. 8), servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks (e.g., network 806, as depicted in FIG. 8), servers, operating systems, or storage, but has control over the deployed applications and possibly application hosting environment configurations.

Infrastructure as a Service (IaaS): the capability provided to the consumer is to provision processing, storage, networks (e.g., network 806, as depicted in FIG. 8), and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Database as a Service (DBaaS): a cloud-based approach to the storage and management of structured data that delivers database functionality similar to what is found in relational database management systems (RDBMSes) such as, for example, SQL Server, MySQL, and Oracle. DBaaS provides a flexible, scalable, on-demand platform oriented toward self-service and database management, particularly in terms of provisioning a business' own environment. DBaaS systems can include monitoring engines to track performance and usage, error monitoring, and data analysis engines.

Deployment Models can include the following:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party either locally or remotely.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 6:
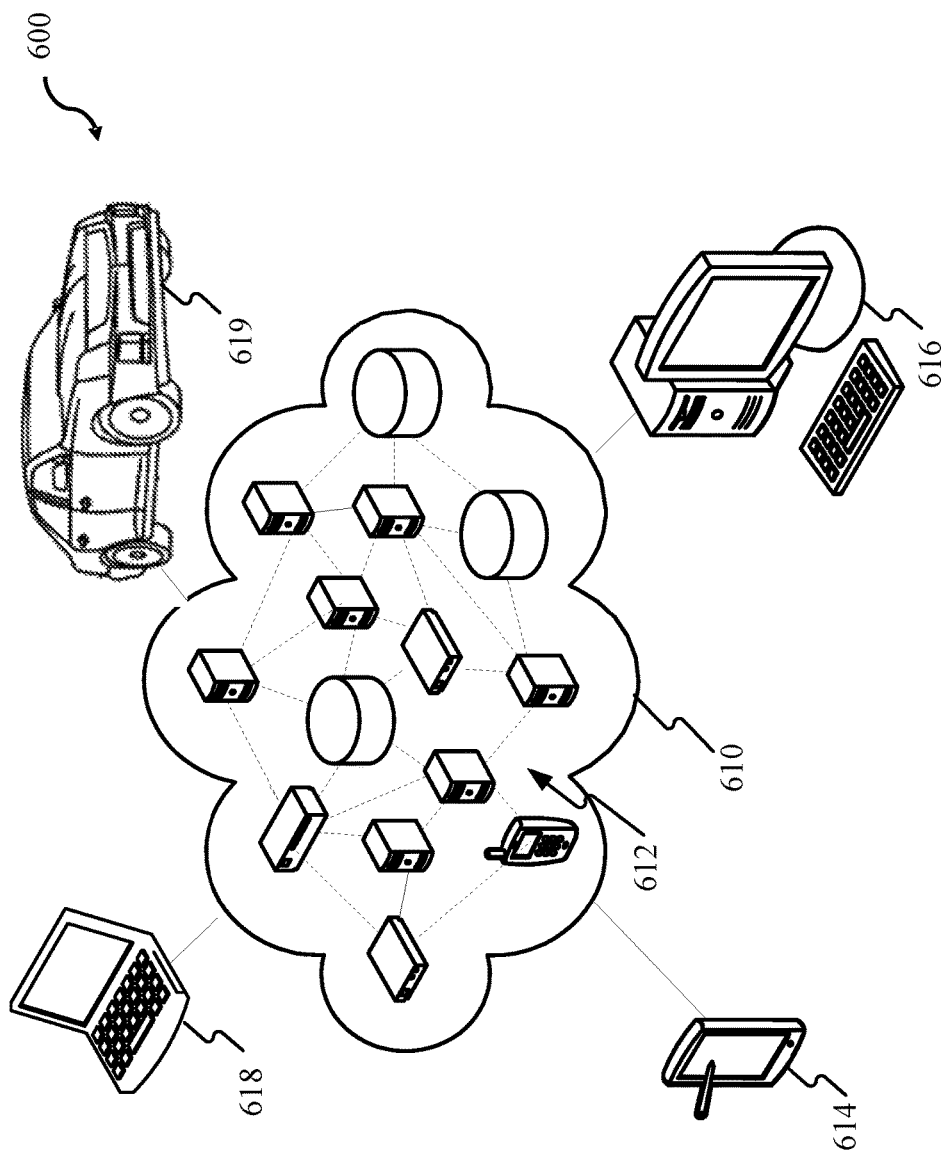
FIG. 6 depicts a cloud computing environment according to one or more embodiments of the present invention.

FIG. 6 depicts a cloud computing environment for use in practicing the teachings herein. As shown in FIG. 6, cloud computing environment 600 comprises one or more cloud computing nodes 612 with which local computing devices used by cloud consumers, such as, for example, a mobile device 614, a desktop computer 616, a laptop computer 618, and/or an automobile computer system 619 can communicate. Cloud computing nodes 612 can communicate with one another. They can be grouped (not shown) physically or virtually, in one or more networks 610, such as a Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 614-619 shown in FIG. 6 are intended to be illustrative only and that cloud computing nodes 612 and cloud computing environment 600 can communicate with any type of computerized device over any type of network and/or network addressable connection (e.g., using a web browser).

Figure 7:
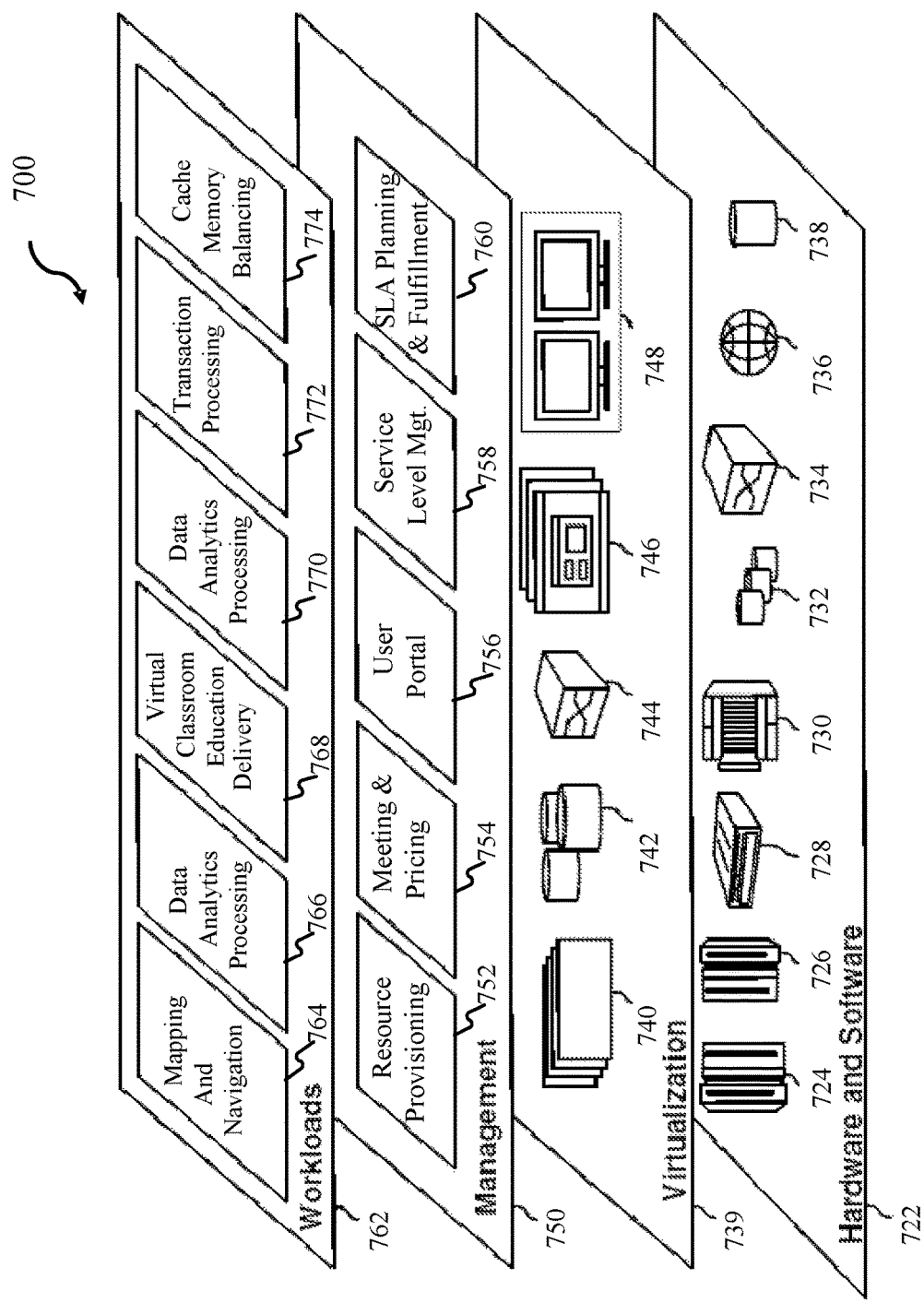
FIG. 7 depicts abstraction model layers according to one or more embodiments of the present invention.

FIG. 7 depicts abstraction model layers, according to one or more embodiments of the present invention. Referring now to FIG. 7, a set of functional abstraction layers 720 provided by cloud computing environment 10 (as depicted in FIG. 6) is shown. It should be appreciated that the components, layers, and functions of functional abstraction layers 720 depicted in FIG. 7 are illustrative only, and embodiments of the invention are not limited thereto. As depicted, the following layers and corresponding functions are provided:

A hardware and software layer 722 can include hardware and software components. Examples of hardware components can include, for example, mainframes 724, 7RISC (Reduced Instruction Set Computer) architecture based servers 726, servers 728, blade servers 730, storage devices 732, and networks and networking components 734. In some embodiments, software components include network application server software 736 and database software 738.

A virtualization layer 739 can provide an abstraction layer from which the following examples of virtual entities can be provided: virtual servers 740, virtual storage 742, virtual networks 744, which can include virtual private networks, virtual applications and operating systems 746, and virtual clients 748.

In one example, a management layer 750 can provide the functions described below. A resource provisioning module 752 can provide dynamic procurement of computing resources and other resources that can be utilized to perform tasks within the cloud computing environment. A metering and pricing resource 754 can provide cost tracking as resources are utilized within the cloud computing environment, and billing or invoicing for consumption of these resources. In one example, metering and pricing resources can include application software licenses. A user portal 756 can provide access to cloud computing environment 600 for consumers and system administrators (not shown). In some embodiments, user portal 756 can provide security and/or identity verification for cloud consumers (e.g., one or more consumers operating one or more of computing devices 614-619) and tasks, as well as protection for data and other resources. A service level management resource 758 can provide cloud computing resource allocation and management such that required service levels are met. A service level agreement (SLA) planning and fulfillment resource 760 can provide pre-arrangement for, and procurement of cloud computing resources for which a future requirement is anticipated in accordance with an SLA.

A workloads layer 762 can provide functionality for which the cloud computing environment can be utilized. For example, workloads layer 762 can include a mapping and navigation resource 764, a software development and lifecycle management resource 766, a virtual classroom education delivery resource 768, a data analytics processing resource 770, a transaction processing resource 772, and cache memory balancing resource 774 in accordance with the present invention.

FIG. 8 depicts a block diagram of a computer system 800 (hereafter "computer 800") for use in practicing the teachings herein. The methods described herein can be implemented in hardware, software (e.g., firmware), or a combination thereof. In an exemplary embodiment, the methods described herein are implemented in hardware, and can be part of the microprocessor of a special or general-purpose digital computer, such as a personal computer, workstation, minicomputer, or mainframe computer. Computer 800 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 8, the computer 800 includes processor 801. Computer 800 also includes memory 802 coupled to processor 801, and one or more input/output adapters 803 that can be communicatively coupled via system bus 805. Memory 802 can be operatively coupled to one or more internal or external memory devices via a storage interface 808. Communications adapter 816 can be operatively connect computer 800 to one or more networks 806. System bus 805 can connect one or more user interfaces via input/output (I/O) adapter 803. I/O adapter 803 can connect a plurality of input devices 804 to computer 800. Input devices can include, for example, a keyboard, a mouse, a microphone, a sensor, etc. System bus 805 can also connect one or more output devices 807 via I/O adapter 803. Output device 807 can include, for example, a display, a speaker, a touchscreen, etc.

Processor 801 is a hardware device for executing hardware instructions or software, particularly that stored in a non-transitory computer-readable memory (e.g., memory 802). Processor 801 can be any custom made or commercially available processor, a central processing unit (CPU), a plurality of CPUs, for example, CPU 801a-801c, an auxiliary processor among several other processors associated with the computer 800, a semiconductor based microprocessor (in the form of a microchip or chip set), or generally any device for executing instructions. Processor 801 can include a cache memory 822, which can include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 822 can be organized as a hierarchy of more cache levels (L1, L2, etc.).

Processor 801 can be disposed in communication with one or more memory devices (e.g., RAM 809, ROM 810, one or more external databases 821, etc.) via a storage interface 808. Storage interface 808 can also connect to one or more memory devices including, without limitation, one or more databases 821, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives can be, for example, a drum, a magnetic disc drive, a magneto-optical drive, an optical drive, a redundant array of independent discs (RAID), a solid-state memory device, a solid-state drive, etc.

Memory 802 can include random access memory (RAM) 809 and read only memory (ROM) 810. RAM 809 can be any one or combination of volatile memory elements (e.g., DRAM, SRAM, SDRAM, etc.). ROM 810 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 802 can incorporate electronic, magnetic, optical, and/or other types of non-transitory computer-readable storage media. Memory 802 can also be a distributed architecture, where various components are situated remote from one another, but can be accessed by processor 801.

The instructions in memory 802 can include one or more separate programs, each of which comprises an ordered listing of computer-executable instructions for implementing logical functions. In the example of FIG. 8, the instructions in memory 802 can include an operating system 811. Operating system 811 can control the execution of other computer programs and provides scheduling, input-output control, file and data management, memory management, and communication control and related services.

The instructions in memory 802 can further include application data 812, and a user interface 813.

Memory 802 can also include a cache memory balancing engine 814, configured perform one or more of the operations described with respect to FIGS. 2-4. I/O adapter 803 can be, for example but not limited to, one or more buses or other wired or wireless connections. I/O adapter 803 can have additional elements (which are omitted for simplicity) such as controllers, microprocessors, buffers (caches), drivers, repeaters, and receivers, which can work in concert to enable communications. Further, I/O adapter 803 can facilitate address, control, and/or data connections to enable appropriate communications among the aforementioned components.

I/O adapter 803 can further include a display adapter coupled to one or more displays. I/O adapter 803 can be configured to operatively connect one or more input/output (I/O) devices 807 to computer 800. For example, I/O 803 can connect a keyboard and mouse, a touchscreen, a speaker, a haptic output device, or other output device. Output devices 807 can include but are not limited to a printer, a scanner, and/or the like. Other output devices can also be included, although not shown. Finally, the I/O devices connectable to I/O adapter 803 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments of the present invention, computer 800 can include a mobile communications adapter 823. Mobile communications adapter 823 can include GPS, cellular, mobile, and/or other communications protocols for wireless communication.

In some embodiments of the present invention, computer 800 can further include communications adapter 816 for coupling to a network 806.

Network 806 can be an IP-based network for communication between computer 800 and any external device. Network 806 transmits and receives data between computer 800 and devices and/or systems external to computer 800. In an exemplary embodiment, network 806 can be a managed IP network administered by a service provider. Network 806 can be a network internal to an aircraft, such as, for example, an avionics network, etc. Network 806 can be implemented in a wireless fashion, e.g., using wireless protocols and technologies, such as WiFi, WiMax, etc. Network 806 can also be a wired network, e.g., an Ethernet network, an ARINC 429 network, a controller area network (CAN), etc., having any wired connectivity including, e.g., an RS232 connection, R5422 connection, etc. Network 806 can also be a packet-switched network such as a local area network, wide area network, metropolitan area network, Internet network, or other similar type of network environment. The network 806 can be a fixed wireless network, a wireless local area network (LAN), a wireless wide area network (WAN) a personal area network (PAN), a virtual private network (VPN), intranet or other suitable network system.

Network 806 can operatively connect computer 800 to one or more devices including device 817, automobile 818, and device 820. Network 806 can also connect computer 800 to one or more servers such as, for example, server 819.

If computer 800 is a PC, workstation, laptop, tablet computer and/or the like, the instructions in the memory 802 can further include a basic input output system (BIOS) (omitted for simplicity). The BIOS is a set of essential routines that initialize and test hardware at startup, start operating system 811, and support the transfer of data among the operatively connected hardware devices. The BIOS is stored in ROM 810 so that the BIOS can be executed when computer 800 is activated. When computer 800 is in operation, processor 801 can be configured to execute instructions stored within the memory 802, to communicate data to and from the memory 802, and to generally control operations of the computer 800 pursuant to the instructions.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for cache memory management in a distributed computing environment, the method comprising:
    tracking, via a cache balancing engine, a plurality of vehicles operating in a first region;
    executing, via the cache balancing engine, an analysis for a subset of the plurality of vehicles in the first region to determine a weighted mean velocity for each vehicle in the subset of the plurality of vehicles in the first region;
    determining, via the cache balancing engine, based on the analysis, whether a second regional server tracking a second plurality of vehicles in a second region is likely to have an unbalanced cache memory; and
    rebalancing, via the cache balancing engine, cache memory data in a first regional server and cache memory data in the second regional server responsive to determining that the second regional server is likely to have an unbalanced cache memory.

2. The computer-implemented method of claim 1, wherein the second regional server is configured for tracking a second plurality of vehicles in the second region, and the second region is adjacent to the first region.

3. The computer-implemented method of claim 1, wherein the vehicles are operatively connected and receiving real-time context information indicative of operational factors.

4. The computer-implemented method of claim 1, wherein rebalancing cache memory in the first regional server and the second regional server comprises:
    determining, via the cache balancing engine, one or more operational factors, associated with the subset of the plurality of vehicles in the first region;
    writing, via the cache balancing engine, cache memory data associated with the first regional to the second regional server based on the one or more operational factors; and
    modifying, via the cache balancing engine, the second region to include a portion of the first region, wherein the portion of the first region included in a modified second region is proximal to a boundary dividing the first region and the second region.

5. The computer-implemented method of claim 4, wherein the operational factors are selected from a group consisting of: a moving trend, traffic information, weather information, global positioning system (GPS) information, geographic map information, sensor data, and velocity information.

6. The computer-implemented method of claim 1 wherein, the analysis is a direction analysis, further comprising:
    calculating a direction and velocity at a position of two or more vehicles of the plurality of vehicles;
    determining, based on the direction and velocity, and position of said each of two or more vehicles, at least two normalized vectors;
    determining a distance between the normalized vectors; and
    evaluating a weighted mean velocity based on at least the distance between the normalized vectors.

7. The computer-implemented method of claim 6, further comprising, weighting vectors based on a sample time of determining relative positions of the two or more vehicles;
    said determining a distance between the normalized vectors further comprises determining a distance between normalized vectors;
and
    said evaluating a weighted mean velocity is further based on a determined distance between the normalized vectors, wherein samples taken later in time are weighted more heavily than samples taken earlier in time.

8. A system for cache memory management in a distributed computing environment, the system comprising:
    a processor in a first regional server configured to:
        track a plurality of vehicles operating in a first region;
        execute an analysis for a subset of the plurality of vehicles in the first region to determine a weighted mean velocity for each vehicle in the subset of the plurality of vehicles in the first region;
        determine, based on a direction analysis, whether a second regional server tracking a second plurality of vehicles in a second region is likely to have an unbalanced cache memory; and
        rebalance cache memory data in the first regional server and cache memory data in the second regional server responsive to determining that the second regional server is likely to have an unbalanced cache memory.

9. The system of claim 8 further comprising a second regional server connected to the processor in the distributed computing environment, wherein the second regional server is configured for tracking the second plurality of vehicles in the second region, and the second region is adjacent to the first region.

10. The system of claim 8, wherein the vehicles are operatively connected to the processor and receiving real-time context information indicative of operational factors.

11. The system of claim 8, wherein rebalancing cache memory in the first region and the second region comprises:
    determining one or more operational factors, associated with the subset of the plurality of vehicles in the first region;
    writing cache memory data associated with the first regional to the second regional server based on the one or more operational factors; and
    modifying the second region to include a portion of the first region, wherein the portion of the first region included in a modified second region is proximal to a boundary dividing the first region and the second region.

12. The system of claim 11, wherein the operational factors are selected from a group consisting of: a moving trend, traffic information, weather information, global positioning system (GPS) information, geographic map information, sensor data, and velocity information.

13. The system of claim 8, wherein, for each vehicle in the plurality of vehicles in the first region, the direction analysis comprises:
    calculating a direction and velocity at a position of two or more vehicles of the plurality of vehicles;
    determining, based on the direction and velocity, and position of said each of two or more vehicles, at least two normalized vectors;
    determining a distance between the normalized vectors; and
    evaluating a weighted mean velocity based on at least the distance between the normalized vectors.

14. The system of claim 13, wherein the direction analysis further comprises weighting vectors based on a sample time of determining relative positions of the two or more vehicles;
- said determining a distance between the normalized vectors further comprises determining a distance between the normalized vectors; and
- said evaluating a weighted mean velocity is further based on a determined distance between the normalized vectors, wherein samples taken later in time are weighted more heavily than samples taken earlier in time.

15. A computer program product for cache memory management in a distributed computing environment, the computer program product comprising a computer readable storage medium having program instructions embodied therewith, the program instructions executable by a processor in a first regional server to cause the processor to perform a method comprising:
- tracking a plurality of vehicles operating in a first region;
- executing an analysis for a subset of the plurality of vehicles in the first region to determine a weighted mean velocity for each vehicle in the subset of the plurality of vehicles in the first region;
- determining based on the analysis, whether a second regional server tracking a second plurality of vehicles in a second region is likely to have an unbalanced cache memory; and
- rebalancing cache memory data in the first regional server and cache memory data in the second regional server responsive to determining that the second regional server is likely to have an unbalanced cache memory.

16. The computer program product of claim 15, wherein the second regional server is configured for tracking a second plurality of vehicles in the second region, and the second region is adjacent to the first region.

17. The computer program product of claim 15, wherein the program instructions are provided as a service in a cloud environment.

18. The computer program product of claim 15, wherein rebalancing cache memory in the first regional server and the second regional server comprises:
- determining one or more operational factors, associated with the subset of the plurality of vehicles in the first region;
- writing cache memory data associated with the first regional to the second regional server based on the one or more operational factors; and
- modifying the second region to include a portion of the first region, wherein the portion of the first region included in a modified second region is proximal to a boundary dividing the first region and the second region.

19. The computer program product of claim 18, wherein the operational factors are selected from a group consisting of: a moving trend, traffic information, weather information, global positioning system (GPS) information, geographic map information, sensor data, and velocity information.

20. The computer program product of claim 15, wherein, for each vehicle in the plurality of vehicles in the first region, the direction analysis comprises:
- calculating a direction and velocity at a position of two or more vehicles of the plurality of vehicles;
- determining, based on the direction and velocity, and position of said each of two or more vehicles, at least two normalized vectors;
- determining a distance between the normalized vectors; and
- evaluating a weighted mean velocity based on at least the distance between the normalized vectors.

* * * * *